(12) United States Patent
Geyer et al.

(10) Patent No.: US 6,637,541 B2
(45) Date of Patent: Oct. 28, 2003

(54) STEERING SYSTEM HAVING AN INTERLOCKING MECHANISM

(75) Inventors: Frank Geyer, Southfield, MI (US); Maged Radamis, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/025,522

(22) Filed: Dec. 17, 2001

(65) Prior Publication Data

US 2003/0111290 A1 Jun. 19, 2003

(51) Int. Cl.⁷ .................................................. B62D 5/04
(52) U.S. Cl. ........................................ 180/402; 180/411
(58) Field of Search .............................. 180/9.44, 402, 180/443, 444, 411

(56) References Cited

U.S. PATENT DOCUMENTS

| | | | |
|---|---|---|---|
| 4,367,803 A | 1/1983 | Wittren | 180/153 |
| 4,694,925 A | 9/1987 | Roberts | 180/79.1 |
| 4,741,409 A | 5/1988 | Westercamp et al. | 180/79.1 |
| 4,987,788 A | 1/1991 | Bausch | 74/89.15 |
| 5,002,142 A | 3/1991 | Klosterhaus | 180/79.1 |
| 5,595,089 A | 1/1997 | Watanabe et al. | 74/89.15 |
| 5,904,224 A | 5/1999 | Onodera et al. | 180/444 |
| 5,921,344 A | 7/1999 | Boyer | 180/444 |
| 6,123,167 A | 9/2000 | Miller et al. | 180/444 |
| 6,176,341 B1 | 1/2001 | Ansari | 180/402 |
| 6,554,094 B1 * | 4/2003 | Bell et al. | 180/402 |

\* cited by examiner

*Primary Examiner*—Lesley D. Morris
*Assistant Examiner*—Matthew Luby
(74) *Attorney, Agent, or Firm*—Brinks Hofer Gilson & Lione (57) ABSTRACT

A steering system capable of mechanically coupling together a first steering motor and a second steering motor to form a mechanically coupled steering motor unit so that one steering motor is operable to move both a first rack and a second rack together with minimal lost motion between the mechanically coupled steering motor unit, the first rack and the second rack.

24 Claims, 5 Drawing Sheets

STEERING SYSTEM HAVING AN INTERLOCKING MECHANISM

FIELD

The present invention relates to steering systems for automotive vehicles. More specifically, the present invention relates to steering systems having linear independent actuators having an interlocking mechanism.

BACKGROUND

Conventional mechanically coupled steering systems use a single actuation rack to steer both steerable wheels. As an operator turns a steering wheel, mechanical couplings between the steering wheel and the actuation rack, as well as between the actuation rack and each steerable wheel, results in the steerable wheels turning together in tandem.

It is sometimes desirable, however, for a pair of steerable wheels to turn at different rates and angles. The development of steer-by-wire systems accomplishes this by providing a steering motor for each steerable wheel on a vehicle that allows for the turning of each steerable wheel at a different rate and angle. Further, development of steer-by-wire systems allows for the elimination of mechanical couplings between the operator controlled steering wheel and the steerable wheels, as well as the elimination of the need to have the steerable wheels of a vehicle mechanically coupled together. Such modifications reduced the cost and weight of the vehicle.

These systems, however, lack a fail-safe feature. Such a feature is required in situations, for example, where one steering motor becomes inoperable. The steerable wheel that was steered by the inoperable steering motor becomes either uncontrollable or becomes locked in position. This can create a safety hazard. Attempts have been made to create a mechanical coupling between the steerable wheels to provide a backup safety feature. For example, if a steering motor should fail, the backup safety feature allows the operable steering motor to steer both steerable wheels. Several problems exist, however, with such mechanical couplings.

In one example, a relatively small amount of play exists between the elements of the mechanical couplings and the two steerable wheels that are coupled together. Such an arrangement restricts movement of each steerable wheel relative to each other. Further, such traditional mechanical couplings require that the steerable wheels remain mechanically coupled together at all times. The mechanical couplings in this configuration tend to limit or even eliminate the ability to steer each steerable wheel separately.

In another example, a relatively large amount of play has been designed to exist between the elements of the mechanical couplings and the two steerable wheels that are coupled together. In such a system, if one steering motor becomes inoperable, the amount of play designed into the mechanical couplings results in lost motion between the steerable wheel with the operable steering motor and the steerable wheel with the inoperable steering motor. In such lost motion mechanical coupling systems, the mechanically coupled steerable wheel with an inoperable steering motor does not respond in tandem with the steerable wheel with an operable steering motor. This situation can create unfavorable and unsafe driving conditions for the operator as the steering input to the steering wheel may not result in the expected behavior from the steerable wheels.

BRIEF SUMMARY

In one aspect of the invention, a steering system is provided. The system includes a housing with a first end and a second end, a first steering motor is operatively connected to the housing, and a second steering motor is operatively connected to the housing. A first gear set is operatively connected to the first steering motor, and a second gear set is operatively connected to the second steering motor. A first screw device is operatively connected to the first gear set, and a second screw device is operatively connected to the second gear set. A first rack is operatively connected to the first gear set and is slidably connected to the first end of the housing. A second rack is operatively connected to the second gear set and is slidably connected to the second end of the housing. A differential operatively connected to the housing and capable of mechanically coupling the first steering motor and the second steering motor together is also provided.

Coupling the first steering motor and the second steering motor together through a differential forms a mechanically coupled steering motor unit and allows the mechanically coupled steering motor unit to move both the first rack and the second rack together with minimal lost motion between the mechanically coupled steering motor unit, the first rack, and the second rack.

A further aspect of the invention is embodied in a method for steering a vehicle. The method includes providing a steering system having a housing with a first end and a second end. A first steering motor is operatively connected to the housing. A first rack is operatively connected to the first steering motor and the first rack is slidably connected to the first end of the housing. A second steering motor is operatively connected to the housing. A second rack is operatively connected to the second steering motor and the second rack is slidably connected to the second end of the housing. A differential is operatively connected to the housing and is capable of selectively mechanically coupling the first steering motor and the second steering motor together.

Once a failure of one of the first steering motor and the second steering motor is detected, the operable steering motor and the inoperable steering motor are coupled together through the differential to form a mechanically coupled steering motor unit. The mechanically coupled steering motor unit is utilized to move the first rack and the second rack together with minimal lost motion between the mechanically coupled steering motor unit, the first rack and the second rack. Because there is minimal lost motion an operator may maintain steering control in the event one of the first steering motor and the second steering motor fails.

In another aspect of the invention, a method of torque sharing for a steering system is provided. The system includes a housing with an outer cornering end and an inner cornering end. A outer cornering steering motor is operatively connected to the housing. A outer cornering rack is operatively connected to the outer cornering steering motor and the outer cornering rack is slidably connected to the outer cornering end of the housing. An inner cornering steering motor operatively connected to the housing. An inner cornering rack is operatively connected to the inner cornering steering motor and the inner cornering rack is slidably connected to the inner cornering end of the housing. A differential capable of selectively mechanically coupling the first steering motor and the second steering motor together to form a mechanically coupled steering motor unit is also provided.

The method involves detecting an outer cornering steering load on the outer cornering rack and detecting an inner cornering steering load on the inner cornering rack. The steering loads on the outer cornering rack and the inner cornering rack are compared to determine whether the outer cornering rack has a greater steering load than the inner cornering rack. If it is determined the outer cornering rack has a greater steering load than the inner cornering rack, the value of the difference between the outer cornering steering load and the inner cornering steering load is compared with a given threshold value. If it is determined the difference between the outer cornering steering load and the inner cornering steering load is greater than a given threshold value then the outer cornering steering motor and the inner cornering steering motor are mechanically coupled together through the differential to form a mechanically coupled steering motor unit which provides added torque to the outer cornering rack.

Once the difference between the outer cornering steering load and the inner cornering steering load is determined to have fallen below a given threshold value, the outer cornering steering motor and the inner cornering steering motor are uncoupled through the differential. The torque produced by the outer cornering steering motor is then provided to the outer cornering rack and the torque produced by the inner cornering steering motor is provided to the inner cornering rack.

In still another aspect of the present invention, a method of operating a steering system is provided. The method involves detecting a desire by an operator for a rapid deceleration condition. Once a desire for a rapid deceleration condition by an operator has been detected, the first rack and the second rack are mechanically coupled together through the differential. The coupled steering motor unit moves the first steering rack and the second steering rack together in such a fashion to create an increased toe-in condition for the first steerable wheel and the second steerable wheel to assist in slowing the vehicle.

Once a desire by an operator to return to a normal driving condition is detected, the first rack and the second rack are mechanically uncoupled. The first steering motor and the second steering motor are then moved in such a fashion to remove the increased toe-in of the first steerable wheel and the second steerable wheel thereby returning the first steerable wheel and the second steerable wheel to a normal driving position.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PRESENTLY PREFERRED EMBODIMENTS

Figure 1:
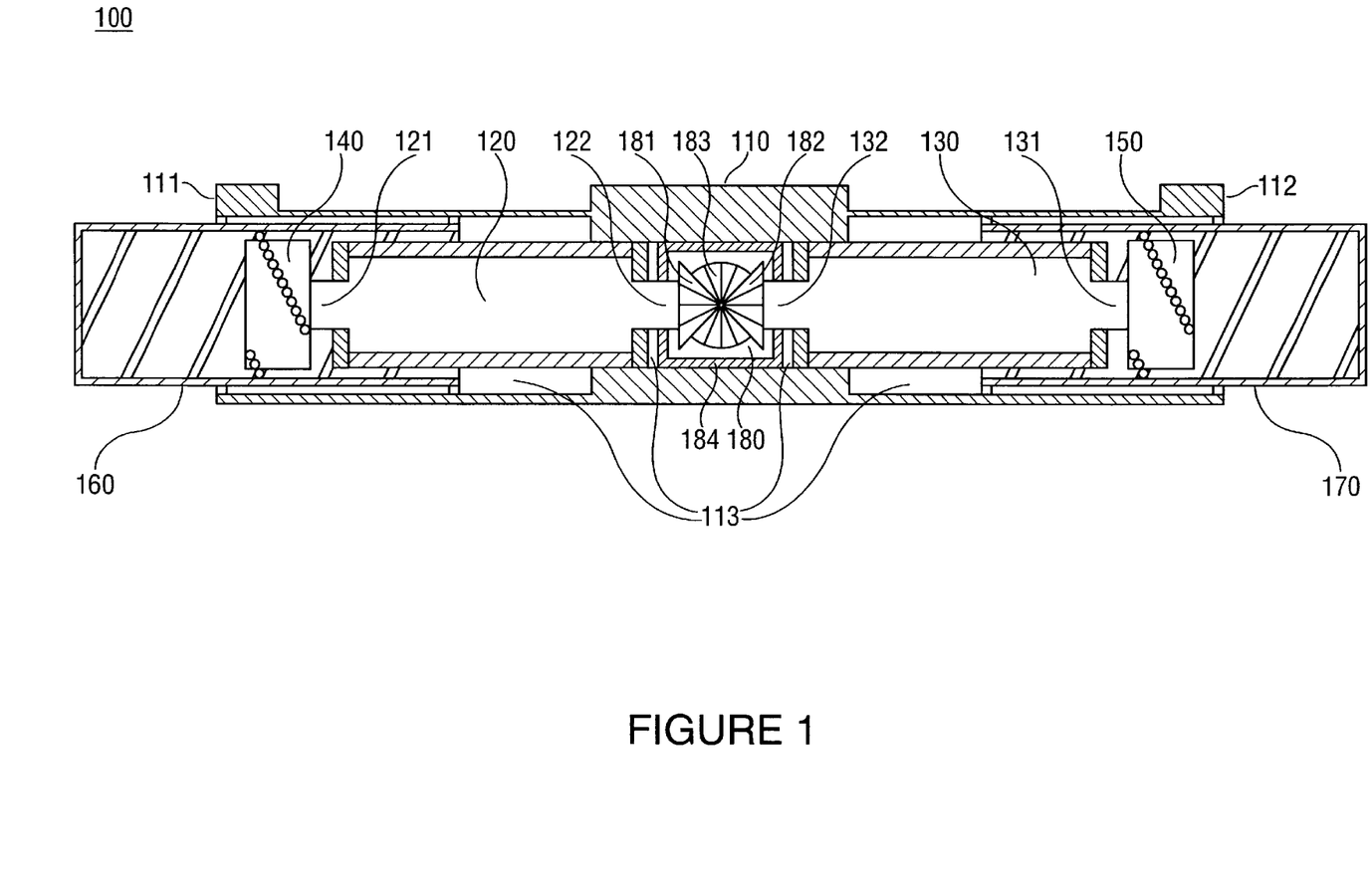
FIG. 1 depicts a cross-section view of an embodiment of the steering system of the present invention.

FIG. 1 depicts a cross-section view of a steering system 100. The steering system 100 preferably has a housing 110 having a first end 111, and a second end 112. The housing may contain various additional elements, including a hollow inner portion, bearings, seals, sensors, and the like and still serve as a housing.

A first steering motor 120 and a second steering motor 130 are operatively connected to the housing 110. The first steering motor 120 and the second steering motor 130 can be any type of motor, including brushless motors and linear actuators capable of attachment to the housing and able to drive a steering system element. Preferably, the first steering motor 120 and the second steering motor 130 are mounted in a hollow portion 113 of the housing. Preferably, the first steering motor 120 and the second steering motor 130 are aligned and mounted so that the center line of the first steering motor 120 is coaxial with the center line of the second steering motor 130 although other arrangements are possible. The first steering motor 120 and the second steering motor 130 are capable of being synchronized by the differential 180 to form a mechanically coupled steering unit.

The term "operatively connected" includes various connection configurations including direct mechanical connection, indirect mechanical connection, and the like. Direct mechanical connection includes the attachment of a first element to a second element. Indirect mechanical connection includes utilizing an intermediate element to make the attachment of a first element to a second element. Indirect mechanical connections may use more than one intermediate element to complete the attachment of a first element to a second element. Other methods known in the art may apply.

Preferably, a first gear set is contained within a first screw device 140 and is operatively connected to the first steering motor 120. The first gear set can be any type of gear set, preferably a planetary gear set, capable of transferring power from the first steering motor 120 to a steering system element. The relationship between the diameter of the gears in the first gear set can be selected so a first steering motor 120 of a selected horse power rating will deliver the desired amount of torque to the steering system 100. Preferably, the first gear set is coaxially mounted with the first steering motor 120 so the first steering motor outer shaft end 121 can be utilized as the central gear portion of a planetary gear set.

Preferably, the first gear set is operatively connected to, and contained within, a first screw device 140. The first screw device 140 is operatively connected to a first rack 160. The first rack 160 is slidably connected to the first end 111 of the housing 110. The first screw device 140 can be any type of screw device, preferably an internally threaded ball screw, capable of transferring power from the first steering motor 120 to a steering system element. Preferably, the first screw device 140 is a ball nut portion of a ball screw and is coaxially mounted to the first steering motor 120. The first rack 160 is preferably coaxially mounted with the first screw device 140. The first rack 160 preferably is a ball shaft portion of an internally threaded ball screw.

An internally threaded ball screw differs from a conventional ball screw in several ways. A conventional ball screw defines threads on the outer surface of a ball shaft 160, 170 and the ball nut 140, 150 moves over the threads on the outside of the ball shaft. An internally threaded ball screw defines the threads on the inner surface of the ball shaft and the ball nut moves over the threads on the inside of the ball shaft. It is difficult to form a seal in a steering system using conventional ball screws because the external threads on the outside of the ball shaft form a somewhat irregular surface. Additionally, conventional ball screw devices require the removal of material from the outside of the ball shaft to form the threads on the ball shaft; this weakens the shaft.

An internally threaded ball screw, however, can have a smooth outer surface on the ball shaft 160, 170. This smooth outer surface is easily adapted to be sealed with the housing 110 of the steering system 100. Another advantage of the internally threaded ball screw is increased strength. The internally threaded ball shaft 160, 170 is stronger, in part, because the ball nut 140, 150, gear sets and steering motors 120, 130 are all fitted inside the ball shaft 160, 170. The ball shaft 160, 170, therefore, has a relatively large diameter, which results in a higher resistance to a bending load.

Preferably, a second gear set is contained within a second screw device 150 and is operatively connected to the second steering motor 130. The second gear set can be any type of gear set, preferably a planetary gear set, capable of transferring power from the second steering motor 130 to a steering system element. The relationship between the diameter of the gears in the second gear set can be selected so a second steering motor 130 of a selected horse power rating will deliver the desired amount of torque to the steering system 100. Preferably, the second gear set is coaxially mounted with the second steering motor 130 so the second steering motor outer shaft end 131 can be utilized as the central gear portion of a planetary gear set.

Preferably, the second gear set is operatively connected to, and contained within, a second screw device 150. The second screw device 150 is operatively connected to a second rack 170. The second rack 170 is slidably connected to the second end 112 of the housing 110. The second screw device 150 can be any type of screw device, preferably an internally threaded ball screw, capable of transferring power from the second steering motor 130 to a steering system element. Preferably, the second screw device 150 is a ball nut portion of a ball screw and is coaxially mounted to the second steering motor 130. The second rack 170 is preferably coaxially mounted with the second screw device 150. The second rack 170 preferably is a ball shaft portion of an internally threaded ball screw.

A differential 180 is preferably operatively connected to the housing 110 and is selectively operatively connected to the first steering motor 120 and the second steering motor 130. Once the first steering motor 120 and the second steering motor 130 are synchronized by the differential 180, a mechanically coupled steering unit is formed. The first steering motor 120 includes an inner shaft end 122 operatively connected to a first differential gear portion 181. The second steering motor 130 includes an inner shaft end 132 operatively connected to a second differential gear portion 182. The first differential gear portion 181 and the second differential gear portion 182 are selectively operatively connected to a third differential gear portion 183. The third differential gear portion 183 is operatively connected to the differential housing 184. The third differential gear portion 183 includes gearing, as is well known in the art, to allow the first differential gear portion 181 and the second differential gear portion 182 to turn in the same direction and in different directions as desired. The differential 180 may include several different configurations as is well known in the art.

The mechanically coupled steering motor unit is operable to move both the first rack 160 and the second rack 170 together with minimal lost motion between the mechanically coupled steering motor unit, the first rack 160 and the second rack 170. Minimal lost motion includes any gear lash associated with a mechanical system having gears. The differential 180 is further capable of selectively uncoupling the first steering motor 120 and the second steering motor 130 so that the mechanically coupled steering motor unit no longer exists.

Preferably the differential 180 may be utilized to move both steerable racks 160, 170 together as a mechanically coupled steering motor unit in the event one steering motor fails. In such a situation it is desirable to have both the mechanically coupled steering motor unit, the first rack 160 and the second rack 170 move together with minimal lost motion between these parts.

When a vehicle executes a turning maneuver, such as turning a corner, the outer cornering rack typically requires more torque than the inner cornering rack to complete the turn. In torque sharing, the differential 180 may be utilized to move both racks. In such a situation, it is desirable to utilize the differential 180 to mechanically couple the steering motors and so that the torque from the first steering motor 120 and the second steering motor 130 can be provided together to the outer cornering rack where it is most needed. This configuration has the added benefit of allowing the first rack 160 and the second rack 170 move together with minimal lost motion between the mechanically coupled steering motor unit, the first rack 160 and the second rack 170.

The differential 180 may also be utilized to assist in vehicle braking. When an operator-desired rapid deceleration condition is detected, such as in a panic braking condition, it is also desirable to mechanically couple the first steering motor 120 and the second steering motor 130 into a steering motor unit. The mechanically coupled steering motor unit moves the first rack 160 and the second rack 170 together with minimal lost motion between the mechanically coupled steering motor unit, the first rack 160 and the second rack 170 to provide an increased amount of toe-in to the first rack 160 and the second rack 170.

A steering system may contain, and be connected to, additional elements such as a tie rod. For example, non-coaxial mounting of the tie rods can be advantageous in conditions where mounting space is critically limited, such as in a vehicle. If mounting space is critically limited in only one or two dimensions, the steering system may be moved in a direction away from the limited mounting space. Due to the large diameter of the ball shaft the tie rods can then be mounted non-coaxially to the rack. Other configurations of the steering system are of course possible.

Figure 2:
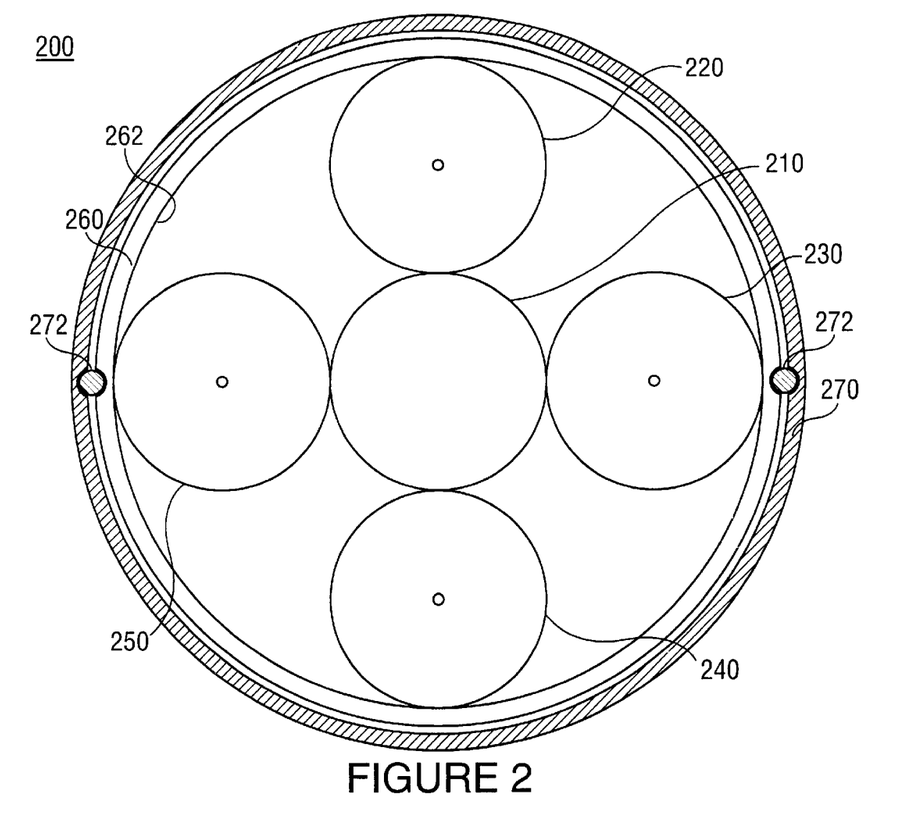
FIG. 2 depicts a top view of a planetary gear set nested inside a ball nut portion of an internal ball screw as implemented in the embodiment of FIG. 1.

FIG. 2 depicts a top view of a planetary gear set 200 nested inside a ball nut portion 260 of an internally threaded ball screw. The planetary gear set 200 includes a central gear portion 210. The central gear portion 210 preferably comprises an outer shaft end 121, 131 of the steering motors 120, 130 of FIG. 1. The central gear portion 210 preferably is operatively connected to a plurality of planet gears 220, 230, 240 and 250. The number of gears can vary. The planet gears 220, 230, 240 and 250 are operatively connected to the outer gear portion 262 defined on the inner surface of the ball nut portion 260. The planet gears 220, 230, 240, and 250 can have a larger or smaller diameter than the central gear portion 210 to provide more or less torque from the central gear portion 210 to the outer gear portion 262. The ball nut portion 260 is operatively connected to a bearing portion 272. The bearing portion 272 is operatively connected to the internally threaded ball shaft 270.

Figure 3:
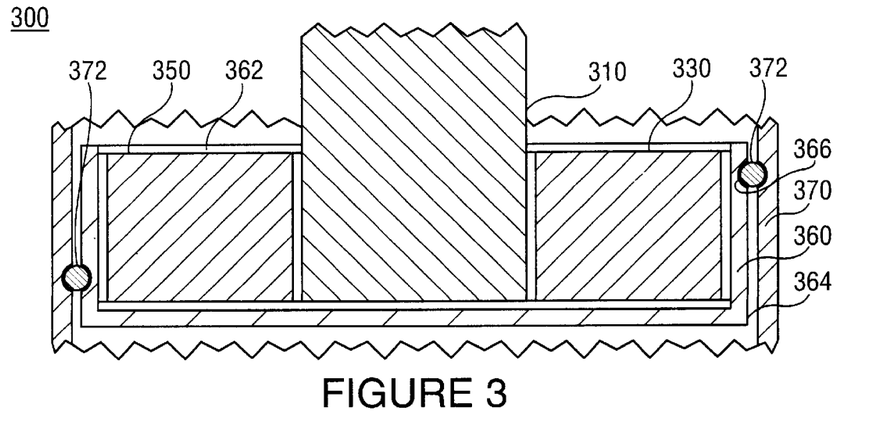
FIG. 3 depicts a cross-section view of a planetary gear set nested inside a ball nut portion of an internal ball screw as implemented in the embodiments of FIGS. 1 and 2.

FIG. 3 depicts a cross-section view of a planetary gear set 300 nested inside a ball nut portion 360 of an internally threaded ball screw. The planetary gear set 300 preferably includes a central gear portion 310. The central gear portion 310 preferably comprises an outer shaft end 121, 131 of a steering motors 120, 130 of FIG. 1. The central gear portion 310 preferably is operatively connected to a plurality of planet gears 330 and 350. The planet gears 330 and 350 are in contact with the outer gear portion 362 defined on the inner surface of the ball nut portion 360. The planet gears 330, 350 can have a larger or smaller diameter than the central gear portion 310 to provide more or less torque from the central gear portion 310 to the outer gear portion 362. The outer surface 364 of the ball nut portion 360 defines a channel 366 to accept a bearing portion 372. The ball nut portion 360 is operatively connected to a bearing portion 372. The bearing portion 372 is operatively connected to the ball screw shaft 370.

Figure 4:
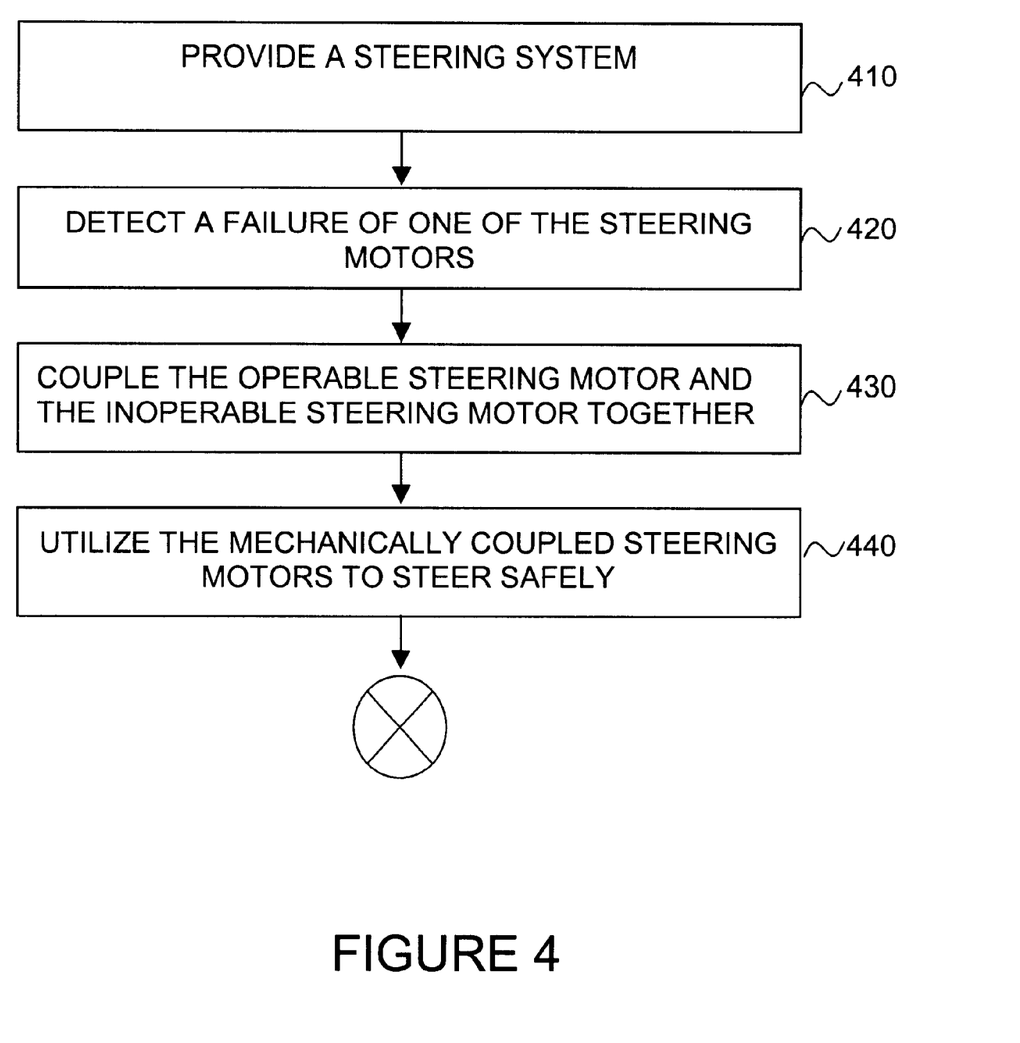
FIG. 4 is a flow chart of an embodiment of a method for steering a vehicle having a steering system having an interlocking mechanism in accordance with the present invention.

FIG. 4 is a flow chart 400 of an embodiment of the present invention of a method for steering a vehicle having a steering system having an interlocking mechanism. The interlocking mechanism provides a fail-safe for the steering system should one steering motor fail.

The method includes providing a steering system 410 as described above in conjunction with FIGS. 1, 2 and 3. Once a failure of one of a first steering motor and a second steering motor 420 is detected the steering system utilizes a differential to mechanically couple the operable steering motor and the inoperable steering motor together to form a mechanically coupled steering motor unit 430. Once the first steering motor and the second steering motor are mechanically coupled together 430, the operable steering motor is utilized to move the first rack and the second rack together through the differential 440. This allows for minimal lost motion between the mechanically coupled steering motor unit, the first rack and the second rack. Because there is minimal lost motion between the mechanically coupled steering motor unit, the first rack, and the second rack, an operator may maintain steering control in the event one of the first steering motor and the second steering motor fails.

Figure 5:
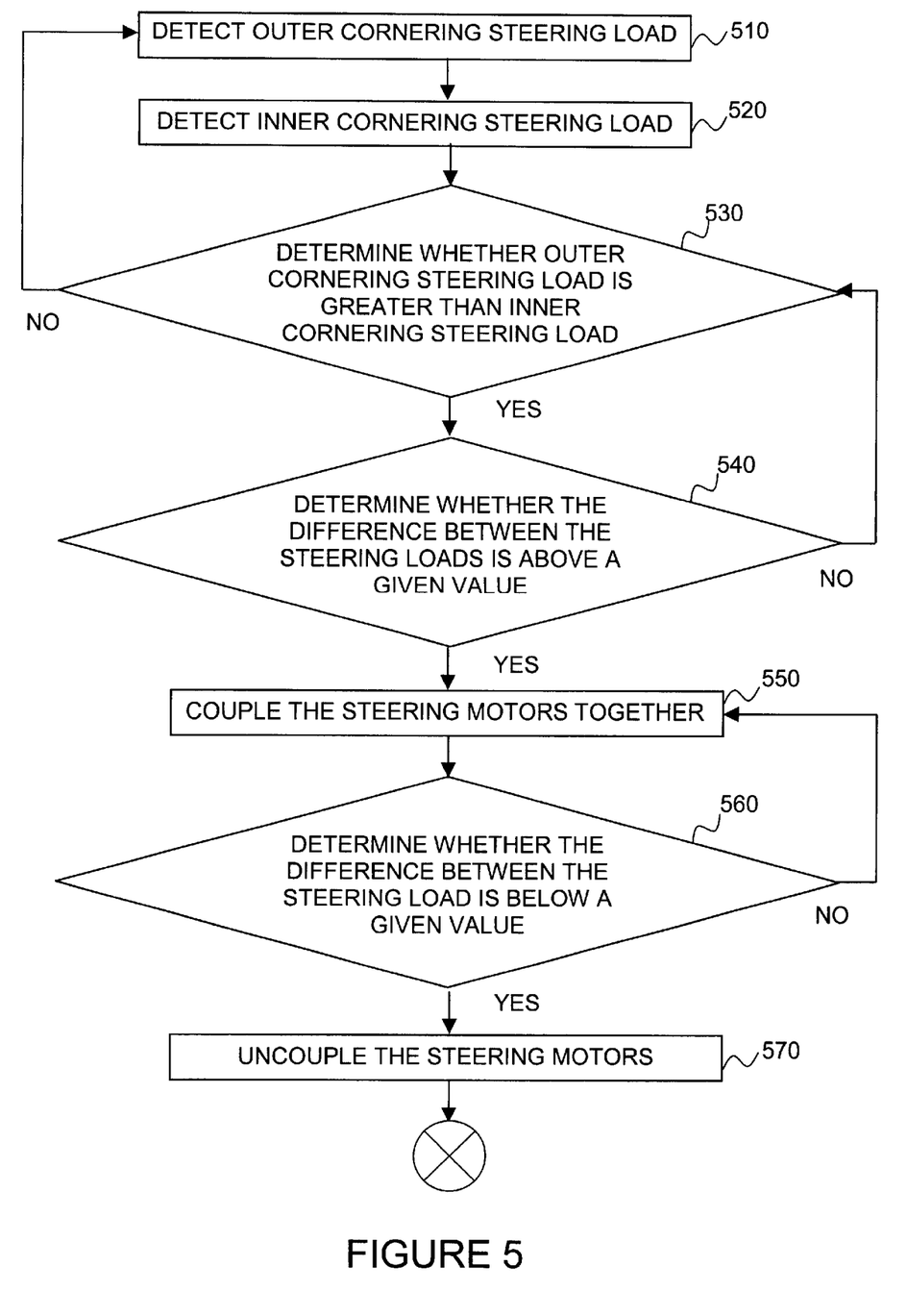
FIG. 5 is a flow chart of an embodiment of a method of torque sharing for a steering system having an interlocking mechanism in accordance with the present invention.

FIG. 5 is a flow chart 500 of an embodiment of the present invention of a method of torque sharing for a steering system having an interlocking mechanism which thereby provides additional torque to an outer cornering steerable wheel. The method utilizes a steering system as described above in conjunction with FIGS. 1, 2 and 3.

The method includes detecting an outer cornering steering load 510 and detecting an inner cornering steering load 520. Once an outer cornering steering load 510 and an inner cornering steering load 520 are detected a comparison is made between the steering loads to determine whether the outer cornering steering load is greater than the inner cornering steering load 530. If it is determined the outer cornering steering load is greater than inner cornering steering load 530, the value of the difference between the outer cornering steering load and the inner cornering steering load is compared with a given threshold value 540. If it is determined that the difference between the outer cornering steering load and the inner cornering steering load is greater than a given threshold value 540 then the outer cornering steering motor and the inner cornering steering motor are mechanically coupled together through the differential to form a mechanically coupled steering motor unit 550. A mechanically coupled steering motor unit is then utilized to provide added torque to the outer cornering rack.

Once it is determined the difference between the outer cornering steering load and the inner cornering steering load has fallen below a given threshold value 560, the outer cornering steering motor and the inner cornering steering motor are uncoupled through the differential 570. The torque produced by the outer cornering steering motor is then provided to the outer cornering steerable wheel and the torque produced by the inner cornering steering motor is provided to the inner cornering steerable wheel.

Figure 6:
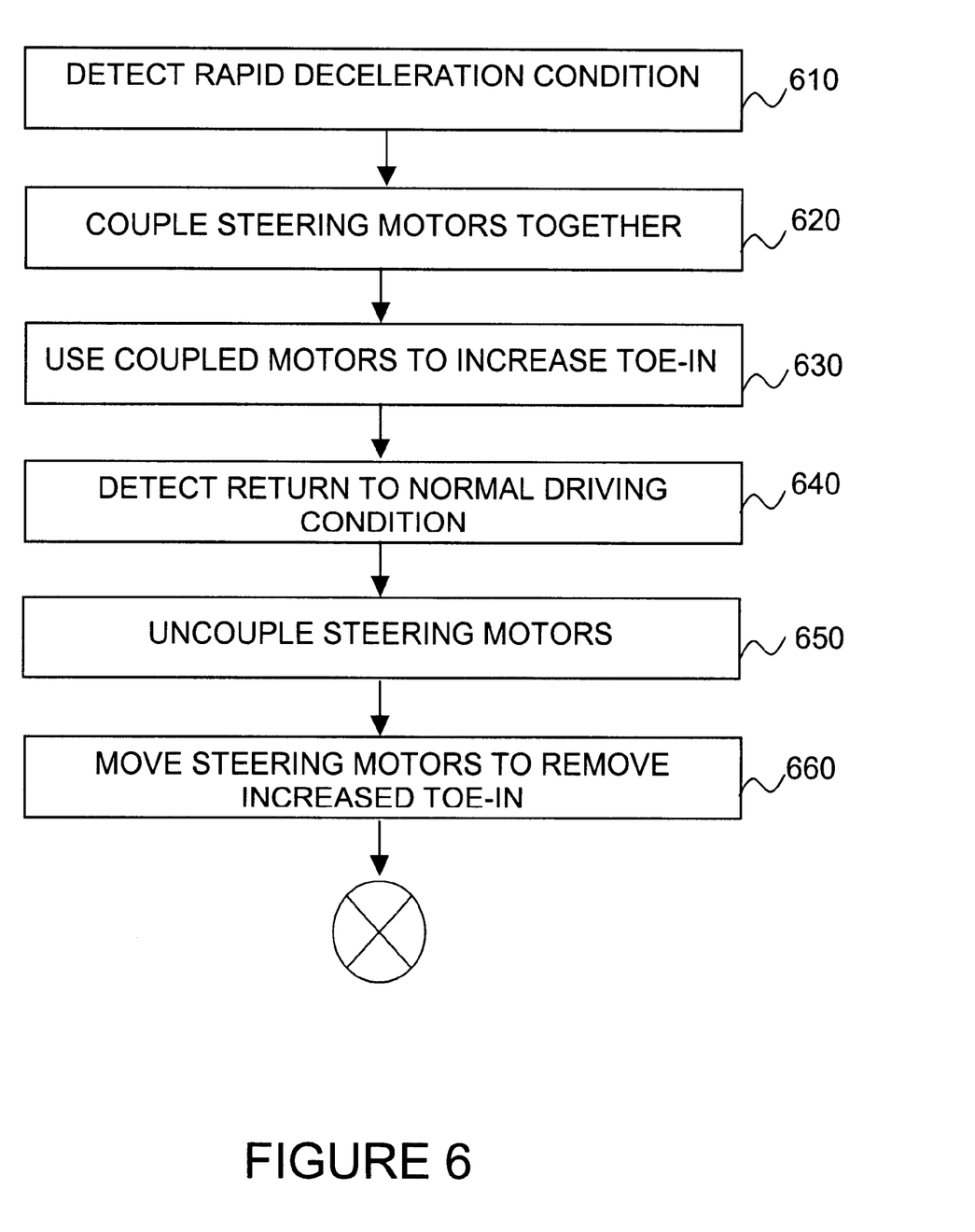
FIG. 6 is a flow chart of an embodiment of a method of operating a steering system having an interlocking mechanism to assist in slowing a vehicle in accordance with the present invention.

FIG. 6 is a flow chart 600 of an embodiment of the present invention of a method of utilizing a steering system having an interlocking mechanism to assist in slowing a vehicle by increasing the amount of toe-in of the steerable wheels. The method utilizes a steering system as described above in conjunction with FIGS. 1, 2 and 3.

The method includes detecting a desire by an operator for a rapid deceleration condition 610. Once a rapid deceleration condition has been detected 610, the first steering motor and the second steering motor are mechanically coupled together through the differential to form a mechanically coupled steering motor unit 620. The coupled unit then moves the first steering rack and the second steering rack together in such a fashion to create an increased toe-in condition to assist in slowing the vehicle 630.

Once a desire by an operator to return to a normal driving condition is detected 640, the first steering motor and the second steering motor are mechanically uncoupled through the differential 650. The first steering motor and the second steering motor are then moved in such a fashion to remove the increased toe-in thereby returning to a normal driving condition 660.

Various embodiments of the invention have been described and illustrated. The description and illustrations, however, are by way of example only. Many more embodiments and implementations are possible within the scope of this invention and will be apparent to those of ordinary skill in the art. The invention, therefore, is not limited to the specific details, representative embodiments, and illustrated examples in this description. Accordingly, the invention is not to be restricted except in light as necessitated by the accompanying claims and their equivalents.

What is claimed is:

1. A steering system comprising:
   a housing having a first end and a second end;
      a first steering motor and a second steering motor operatively connected to the housing;
      a first gear set operatively connected to the first steering motor and having a first screw device operatively connected thereto;
      a second gear set operatively connected to the second steering motor and having a second screw device operatively connected thereto;
      a first rack operatively connected to the first gear set and slidably connected to the first end of the housing;
      a second rack operatively connected to the second gear set and slidably connected to the second end of the housing;

a differential operatively connected to the housing and capable of selectively mechanically coupling the first steering motor and the second steering motor together to form a mechanically coupled steering motor unit; and the mechanically coupled steering motor unit operable to allow the mechanically coupled steering motor unit to move both the first rack and the second rack together with minimal lost motion between the mechanically coupled steering motor unit, the first rack and the second rack.

2. The steering system of claim 1 wherein the operatively connected components are directly physically connected to each other.

3. The steering system of claim 1 wherein the differential synchronizes the first steering motor and the second steering motor into a mechanically coupled steering unit capable of moving the first steering rack and the second steering rack in opposite directions.

4. The steering system of claim 1 wherein the first steering motor and the second steering motor are brushless motors.

5. The steering system of claim 1 wherein the first steering motor and the second steering motor are coaxially aligned.

6. The steering system of claim 1 wherein the first steering motor and the second steering motor are coaxial and are within a hollow portion of the housing.

7. The steering system of claim 1 wherein the central first gear set and the second gear set are planetary gear sets.

8. The steering system of claim 7 wherein a central gear of the first gear set and a central gear of the second gear set are coaxial with the first steering motor and the second steering motor.

9. The steering system of claim 1 wherein a central gear of the first gear set and a central gear of the second gear set are coaxial with the first steering motor and the second steering motor and are within a hollow portion of the housing.

10. The steering system of claim 1 wherein the first screw device and the second screw device are ball screws.

11. The steering system of claim 10 wherein the ball screws are internally threaded ball screws.

12. The steering system of claim 1 wherein the first screw device and the second screw device are coaxial with the first gear set and the second gear set.

13. The steering system of claim 1 wherein the first screw device and the second screw device are coaxial with the first gear set and the second gear set and are contained within the housing.

14. The steering system of claim 1 wherein the first rack and the second rack are internally threaded ball screw shafts.

15. The steering system of claim 1 wherein the first rack and the second rack are coaxial with the first steering motor and the second steering motor.

16. The steering system of claim 1 further comprising a first tie rod operatively connected to the first rack, and a second tie rod operatively connected to the second rack.

17. The steering system of claim 16 wherein the first tie rod is coaxially mounted to the first rack and the second tie rod is coaxially mounted to the second rack.

18. A method for steering a vehicle, said method comprising the steps of:

providing a housing with a first end and a second end, a first steering motor operatively connected to the housing, a first rack operatively connected to the first steering motor, the first rack slidably connected to the first end of the housing, a second steering motor operatively connected to the housing, a second rack operatively connected to the second steering motor, the second rack slidably connected to the second end of the housing, a differential operatively connected to the housing and capable of mechanically coupling the first steering motor and the second steering motor together;

detecting a failure of one of the first steering motor and the second steering motor;

coupling the operable steering motor and the inoperable steering motor together through the differential to form a mechanically coupled steering motor unit; and utilizing the mechanically coupled steering motor unit to move the first rack and the second rack together with minimal lost motion between the mechanically coupled steering motor unit, the first rack and the second rack.

19. A method of torque sharing for a steering system having a housing with an outer cornering end and an inner cornering end, a outer cornering steering motor operatively connected to the housing, an outer cornering rack operatively connected to the outer cornering steering motor, the outer cornering rack slidably connected to the outer cornering end of the housing, an inner cornering steering motor operatively connected to the housing, an inner cornering rack operatively connected to the inner cornering steering motor, the inner cornering rack slidably connected to the inner cornering end of the housing, a differential operatively connected to the housing and capable of selectively mechanically coupling the first steering motor and the second steering motor together, said method comprising:

detecting a outer cornering steering load;

detecting a inner cornering steering load;

determining whether the outer cornering steering load is greater than the inner cornering steering load;

determining whether the difference between the outer cornering steering load and the inner cornering steering load is above a given threshold value; and mechanically coupling the outer cornering steering motor and the inner cornering steering motor through the differential to provide added torque to the outer cornering rack.

20. The method according to claim 19 further comprising the step of determining the difference between the outer cornering steering load and the inner cornering steering load is below a given threshold value.

21. The method according to claim 20 further comprising the step of mechanically uncoupling the outer cornering steering motor and the inner cornering steering motor through the differential so that the torque produced by the outer cornering steering motor is provided to the outer cornering rack and the torque produced by the inner cornering steering motor is provided to the inner cornering rack.

22. A method of operating a steering system having a housing with a first end and a second end, a first steering motor operatively connected to the housing, a first rack operatively connected to the first steering motor, a second steering motor operatively connected to the housing, a second rack operatively connected to the second steering motor, and a differential operatively connected to the housing and capable of selectively mechanically coupling the first steering motor and the second steering motor together, said method comprising:

detecting an operator desired rapid deceleration condition;

mechanically coupling the first steering motor and the second steering motor through the differential to form a mechanically coupled steering motor unit; and utilizing the mechanically coupled steering motor unit to move the first rack and the second rack in such a fashion to create an increased toe-in condition.

23. The method according to claim 22 further comprising the step of detecting an operator desired return to a normal driving condition.

24. The method according to claim 23 further comprising the step of moving the first steering motor and the second steering motor in such a fashion to remove the increased toe-in thereby returning to a normal driving condition.

* * * * *